United States Patent [19]

Innes

[11] Patent Number: 5,510,949
[45] Date of Patent: Apr. 23, 1996

[54] DUTY CYCLE FILTERED TRIP SIGNALLING

[75] Inventor: Mark E. Innes, Asheville, N.C.

[73] Assignee: Eaton Corporation, Cleveland, Ohio

[21] Appl. No.: 168,030

[22] Filed: Dec. 15, 1993

[51] Int. Cl.⁶ .................................................... H02H 3/16
[52] U.S. Cl. ............................... 361/93; 361/94; 361/115
[58] Field of Search ............................... 361/42, 93, 23, 361/28, 29, 30, 94, 115

[56] References Cited

U.S. PATENT DOCUMENTS

| | | | |
|---|---|---|---|
| 4,716,487 | 12/1987 | Horvath et al. | 361/42 |
| 4,819,118 | 4/1989 | Mueller et al. | 361/25 |
| 4,833,565 | 5/1989 | Bauer et al. | 361/154 |
| 4,893,102 | 1/1990 | Bauer | 335/132 |

OTHER PUBLICATIONS

Westinghouse Sales Brochure, "Advantage Control Modules: The Simplest Way to Control a Motor" Apr. 1993.
"Instructions For Advantage Control Modules Used With Full-Voltage Two-Speed Advantage Motor Starters And Contractors"–Jun. 1992.

Primary Examiner—A. D. Pellinen
Assistant Examiner—S. Jackson
Attorney, Agent, or Firm—Martin J. Moran

[57] ABSTRACT

A contactor circuit couples electrical power to a load, and has a current sensor responsive to a level of current for generating an output signal level when the current exceeds a fault threshold. A control circuit coupled to the output signal has a trip output that changes level with the output signal of the current sensor, coupled to its reset input via an indicator circuit, whereby the control circuit is reset when the current exceeds the fault threshold. A bell alarm circuit picks off the trip output for operating an alarm device. The bell alarm circuit has a comparator with an input coupled to a capacitor charged through a resistor and a transistor arranged to discharge the capacitor when the trip output is low. The transistor is responsive to an optical coupler arranged in the indicator circuit in parallel with an indicator LED that is blinked by the control circuit. Whereas the capacitor is discharged substantially immediately upon a low going transition of the trip output signal, the bell alarm discriminates against blinking pulses and the like, regardless of their duty cycle.

12 Claims, 2 Drawing Sheets

DUTY CYCLE FILTERED TRIP SIGNALLING

BACKGROUND OF THE INVENTION

1. Field of the Invention

The invention relates to the field of digital status signalling, and in particular concerns filtering the "trip" output of an electrical circuit protective device for operating a bell alarm or the like in a manner that distinguishes a real trip indication from short-lived pulses and signalling pulses on the trip signal. This is accomplished with a timed switching means that clears between pulses such that filtering is independent of the duty cycle of the pulses.

2. Prior Art

Devices for protecting electrical circuits and loads from fault conditions are often associated with controllable contactors that couple the load to the power line. In AC motor applications, the contactor arrangement is generally called a motor starter. The motor or other load may have a plurality of associated contact sets, operated electromagnetically to connect and disconnect the load and the line. In addition to on/off controls for activating and deactivating the load, a sensing circuit typically monitors the current passing between the line and the load, and often the line voltage as well. The sensing circuit produces a trip signal that triggers decoupling of the load from the line in the event of a detected fault condition.

The fault condition detected may be short term excess current due to a short circuit, long term excess current indicating overloading, a ground fault, phase imbalance or the like. Circuits for detecting such faults typically comprise some form of threshold responsive element generating a triggering signal that causes the contactor to disengage the power line.

The trip circuits of a number of associated contactors can be cascaded such that a trip signal generated by any of the associated contactors causes all of them to disengage their respective loads from the power line. It is generally undesirable to have the contactor trip circuits be so sensitive as to trip on the least pulse on the trip signal, which may be anomalous and not indicative of a real fault condition. Therefore, trip circuits are advantageously designed to trigger more slowly than they might, in order to reduce the incidence of nuisance trips.

In addition to cascading the trip circuits of contactors so they can be commonly tripped, contactors can be operated in a coordinated manner by coupling them to a controller. The controller is also responsive to the trip signal generated by the contactors. The Westinghouse Electric Corporation ADVANTAGE™ line of contactors, for example, includes a control module to which a plurality of contactors can be coupled for coordinated operation of loads such as three phase motors. The control module can include pushbutton controls for "run," "stop," "reverse" and the like, and effects coordinated operation of the contactors to make and break alternative connection configurations between the load and the line. A microprocessor in the control module monitors the status of the contactors via signalling paths.

The control module microprocessor can have a variety of functions such as timed sequence control of the contactors (e.g., to coast or stop before reversing, to start at slow speed and switch to fast after a delay, etc.). The trip signals of the contactors are cascaded, and the control module is responsive to a trip condition in its associated contactors. The control module can signal a trip condition to other control devices, and perhaps other control modules, for coordinated response to a trip condition.

The control module can be reset manually or by a signal applied to the microprocessor, which initializes the microprocessor by resetting its program address counter. The microprocessor has a number of initialization functions, but basically the microprocessor comes up when initialized in a mode wherein the contactors it controls are disengaged from the power line. It is thus possible to couple the trip output of the control module to the reset input of the control module as a way to respond to a trip. When a trip condition is detected causing the trip signal to change state, the microprocessor initializes and the contactors disconnect the loads from the power line.

The trip signal can be coupled to an indicator light for showing the status of the contactor/controller system. In one arrangement of the ADVANTAGE control module, the microprocessor pulses or blinks the trip indicator light and other particular indicator lights that normally are used to indicate "run," "stop" and similar modes, to represent certain states of operation. The control module tests its connections with the contactors as a part of the initialization routine executed after a reset, during which the associated signal lines are pulsed to blink the indicators. In another arrangement, the control module superimposes data pulses on a trip output to signal the status of its contactors. The outputs of the controller, and in particular the trip signal output, can thus routinely change state due to short pulses on the trip signal output due to initialization or other functions, which short pulses are not indicative of a fault condition in the load.

The threshold responsive sensing means associated with the contactor(s), for example a current threshold sensor, also may have certain timing considerations. For example, a direct short circuit as detected by sensing load current over a high current threshold should generate an immediate trip. A lower current threshold that exists for a predetermine, d time may indicate a thermal overload. In practical operation, the trip output of a threshold responsive means may pulse or change state a number of times as the detected current wavers around the threshold and finally remains above the threshold. Devices that are triggered by the threshold responsive means may respond fast, to any change of state on the trip output, or may be triggered only after the trip output has remained in the fault indicating state for more than a predetermined time.

One type of device that is advantageously triggered by such a threshold responsive means is a so-called bell alarm. The bell alarm may operate a bell, indicator light or the like, or simply generate a signal to a further control device. The bell alarm generally is activated when the trip output of the associated contactor or contactor controller changes into the fault indicating state. A relay or the like can be driven from the trip output for this purpose, or the trip output can operate a switching transistor or the like that activates a load device for announcing a trip condition or for signalling the trip condition. A typical bell alarm is triggered by the trip signal to set a latching relay, i.e., with one coil operable to latch the relay for coupling power to activate the alarm or signalling output device, and another to unlatch the relay when the device is reset.

However, problems are encountered due to the nature of the trip signal. Whereas the trip signal may be pulsed as the monitored current or other parameter approaches the triggering threshold, nuisance trips of the bell alarm occur. Also, if the system is one wherein the trip signal is pulsed during initialization and the like, a nuisance trip of the bell alarm may occur. To avoid such nuisance trips, it is possible to provide an additional output of the microprocessor that is not pulsed, and is triggered only after the trip signal changes to the fault indication level and stays there. This is an expensive solution to the nuisance trip problem.

In a typical motor control arrangement, the trip output is coupled to the reset input of a contactor controller via a circuit including an LED or similar local indicator light. A normally open manual reset pushbutton is connected in parallel with the local indicator light, and an RC timing circuit at the reset input provides a reset or power-up delay. In this circuit, pulsing the trip output by the controller apart from a trip condition, such as when starting or initializing, does not cause problems because the pulses are too short to trigger a reset. Moreover, blinking of the LED local indicator is a valuable diagnostic feature. In the event of a fault condition, however, the increasing duty cycle of the pulses, and eventually the steady state change in the level of the trip signal, raise the DC level at the reset input sufficiently to generate a reset.

A bell alarm triggered by this form of output signal transitions intermittently when starting or initializing, similar to the blinking of the indicator. The triggering and operation of tile bell alarm is erratic as the duty cycle of the pulses increases due to an impending trip. The operation of the bell alarm does not correspond with the occurrence of the trip at the controller (i.e., with the reset of the controller). These features are undesirable. It would be preferable to employ a circuit that could distinguish between short pulsing on the trip output and a steady state fault indication, and does not require an output of the microprocessor. An inexpensive and dependable circuit for distinguishing pulsing from steady state changes is needed. The circuit should use available signals (i.e., the trip signal), and should not unduly load the them, or affect the operation of the indicator light, manual reset pushbutton and controller RC reset input.

SUMMARY OF THE INVENTION

It is an object of the invention to provide an alarm signalling output for a contactor that generates a trip output upon occurrence of fault conditions, by picking off the trip output using an optically isolated, duty cycle independent switching means.

It is another object to couple the trip output of such a device to a driver that is minimally expensive and does not affect local signalling or indicator devices associated with a trip output signal.

It is a further object of the invention to provide a bell alarm output that can be simply coupled in parallel with the trip output and reset input of a cascaded contactor device to generate a switched alarm output.

These and other objects are accomplished by a contactor circuit coupling electrical power to a load, and having a current sensor responsive to a level of current for generating an output signal level when the current exceeds a fault threshold. A control circuit coupled to the output signal has a trip output that changes level with the output signal of the current sensor, coupled to its reset input via an indicator circuit, whereby the control circuit is reset when the current exceeds the fault threshold. A bell alarm circuit picks off the trip output for operating an alarm device. The bell alarm circuit has a comparator with an input coupled to a capacitor charged through a resistor and a transistor arranged to discharge the capacitor when the trip output is low. The transistor is responsive to an optical coupler arranged in the indicator circuit in parallel with an indicator LED that is blinked by the control circuit. Whereas the capacitor is discharged substantially immediately upon a low going transition of the trip output signal, the bell alarm discriminates against blinking pulses and the like, regardless of their duty cycle.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
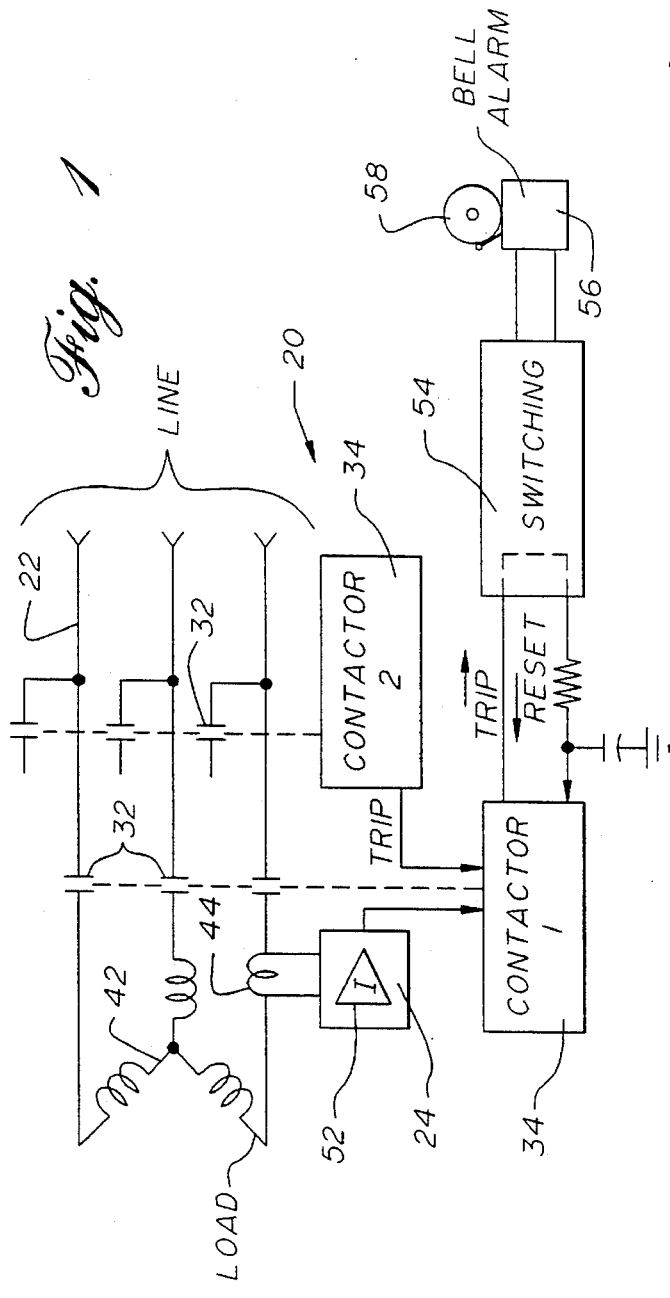
FIG. 1 is a general schematic diagram showing a contactor and bell alarm configuration according to the invention.

A contactor circuit 20 according to the invention is shown generally in FIG. 1. The contactor circuit 20 couples electrical power from a power line 22 to a load, and includes sensing means 24 responsive to a parameter of the electrical power to generate a trip output signal for triggering opening of contacts 32 and disengagement of the load 42 from the line 22 for protecting them from damage.

Figure 2:
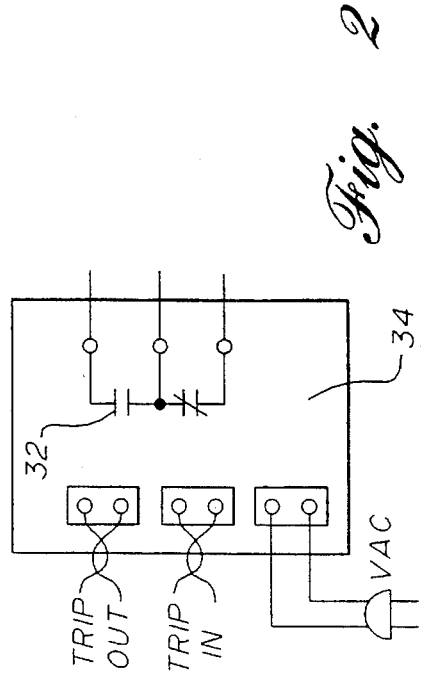
FIG. 2 is a rear panel view of a contactor apparatus illustrating cascading of trip signals.

Such an arrangement can be more or less complicated, depending on the application, and can vary from a single contactor operable to make and break one set of contacts, to a more complex arrangement in which a controller or logic module operates a number of contactors in a coordinated manner to achieve predetermined functions during startup, operation at different speeds, reversal and the like. In the embodiment shown in FIG. 1, a plurality of contactors 34 are provided to achieve alternative connections of the line and the load, for example a three phase electric motor 42. The contactors may be responsive to a controller (not shown in FIG. 1) or may be related in another manner whereby it is appropriate that they all trip if any of them trips. The contactors 34 are cascaded by wiring together their trip outputs and trip inputs, as shown in the back panel view of a contactor 34 in FIG. 2, so that if any of the contactors 34 are tripped they will all disengage their loads from the power line 22.

Referring to FIG. 1, the parameter that is monitored to generate a trip typically includes the current level, detected by monitoring the voltage drop across a resistance in series with the line, or a signal produced by a current transformer 44 as shown. It is also possible to monitor phase balance, ground fault current and the like. For thermal overload, ongoing current levels over a relatively lower threshold may generate a trip, and for short circuit protection even a brief detection of current levels higher than a relatively higher threshold may generate a trip.

The means for monitoring such levels, which may involve a threshold detector 52 or the like, shown schematically in FIG. 1, produces an output that changes from one state to another state for representing presence and absence of a fault condition, for example from one voltage level to another. The detected current level in the event of an impending fault may vary around the fault detection threshold, causing the trip signal to include at least one short pulse that occurs because the trip output signal changes to the fault indication state and then changes back. Additionally, a controller such as microprocessor controller U1, shown in FIG. 2, may superimpose signalling pulses on the trip signal. Such pulses, including preliminary jitter-type pulses suggesting an impending fault, as well as signalling pulses or the like, are preferably not to be interpreted as indications of the fault condition. Therefore, according to the: invention such short term variations or pulses are filtered from the trip signal in operating switching means 54 downstream from the contactors 34 along a signal path.

The switching means in FIG. 1 may be coupled, for example, to a bell alarm 56 or other means to generate an audible or visible alarm to alert the operators. The output of the bell alarm switching means 54 in this connection may operate any of a variety of annunciator devices 56 or may simply generate a signal or switch closure. The switching means 54 is coupled to the trip output signal and comprises a timing circuit 62 and a driver 64 responsive to the timing circuit 62 (see FIG. 4). The driver 64 is coupleable to an alarm output 66.

Figure 3:
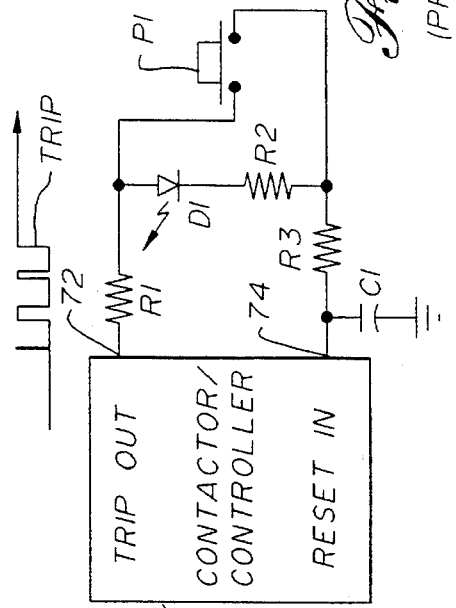
FIG. 3 is a schematic diagram showing coupling a trip output to a reset input according to the prior art.

As shown in FIG. 3, the trip signal from the contactor or contactor controller typically begins to change state intermittently when the monitored parameter becomes close to the triggering threshold and begins to cross over the threshold. Additionally, the contactor or controller may impose signalling pulses or the like. As shown in FIG. 3, it is possible to couple the trip output 72 of such a circuit back into its reset input 74, such that a trip signal causes a processor or other circuit in the contactor/controller to initialize. The circuit initializes with the loads 42 disengaged from the line 22, which has the desired effect of disengaging the loads upon the occurrence of a trip.

The Westinghouse ADVANTAGE line of contactors and contactor controllers is arranged such that during the initialization routine of the contactor or controller, and also during certain controller modes such as starting or reversing, a change of state occurs on the device output. This is used to blink an indicator light D1 as shown in FIG. 3, which is coupled via current limiting resistors R1 and R2 between the trip output 72 and the reset input 74. A manual pushbutton P1 is provided to generate a reset manually. The trip signal is coupled to the reset input 74 via an RC circuit wherein capacitor C1 charges through resistor R3 to provide a reset delay. It is also possible to use this output signal to provide a remote indication of a reset, by wiring the line to a remote LED or pulse decoding circuit (not shown) that is responsive to the signal on the trip output 72.

Figure 4:
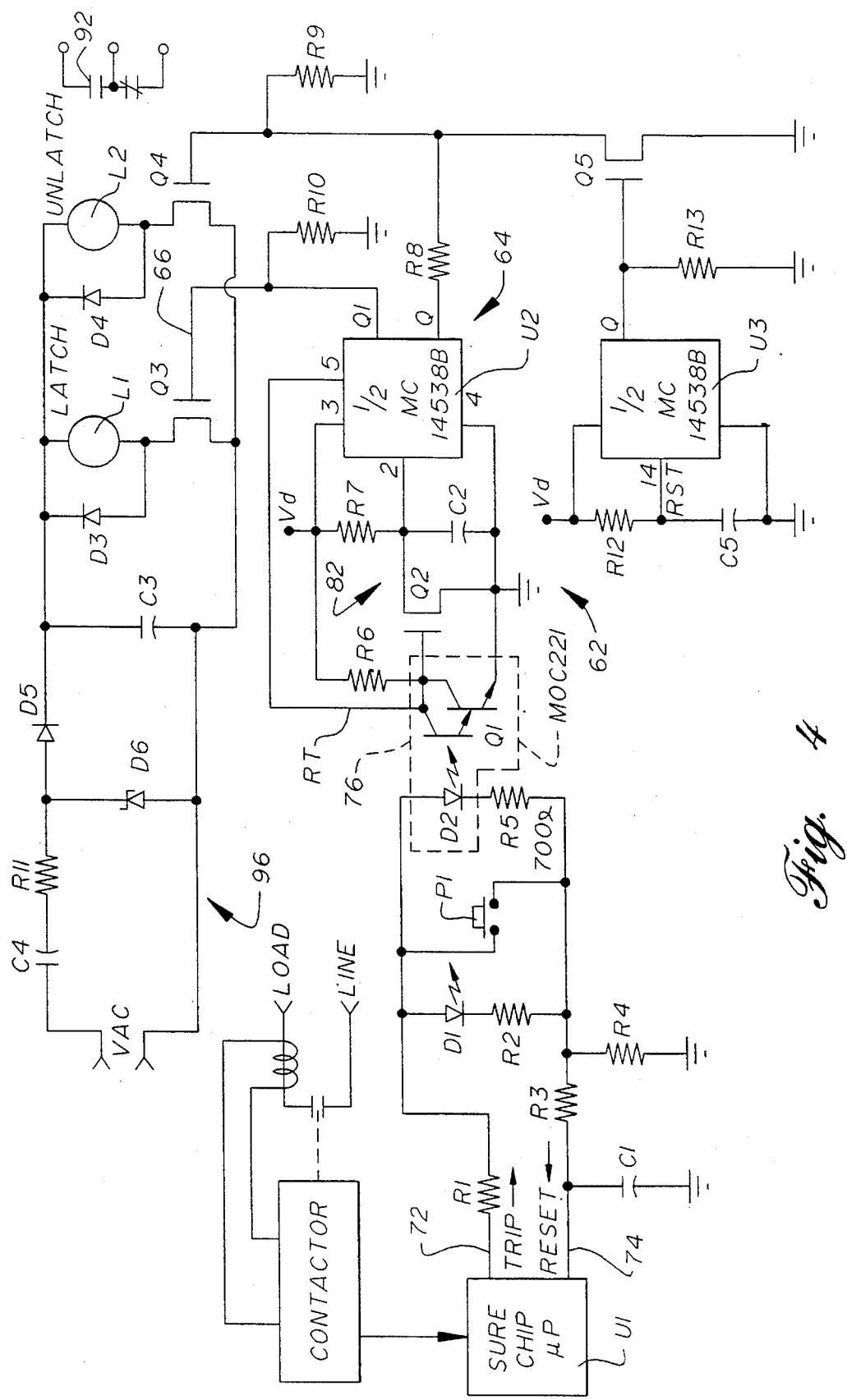
FIG. 4 is a schematic diagram showing a preferred bell alarm driver arrangement according to the invention.

According to the invention, the functions of indicator LED D1 and manual pushbutton P1 are to be retained, using a switching means 54 that picks off the trip signal without affecting the operation of the indicator D1 and pushbutton P1. This is accomplished, for example, as shown in FIG. 4, using the same reference numerals to identify comparable elements. A controller U1 is responsive to a trip signal generated by a contactor 34. As in FIG. 3, the trip output 72 is coupled to the reset input 74 via indicator LED D1, which is blinked, manual pushbutton P1 and the RC reset circuit of R3 and C1. In addition, an optocoupler 76 such as an LED-Darlington phototransistor coupler model MOC221, including LED D2 and phototransistor Q1, is arranged in parallel with the indicator D1 and pushbutton P1 to pick off the trip signal. Resistor R5 limits current loading.

The switching circuit 54 is driven by the output of Q1 through a delay or timing circuit 82 coupled between phototransistor Q1 and a dual comparator switching circuit U2, model MC14538, that operates the output for the bell alarm 56 or the like. The switching means 54 is operable upon a change of state of the trip signal for initializing the timing circuit 62, but the timing circuit 62 has a time constant sufficiently long that the output cannot change state unless the trip signal remains at the level indicating a fault for longer than the time constant. Accordingly, the switching means 54 and timing circuit 82 are effective to filter out the pulse or pulses on the trip signal. The driver 64 and the alarm output are activated after a delay upon the trip output signal changing state and any pulse apart from a true fault condition is blocked from operating the alarm output. In this manner it is possible to employ the same pulsed or blinked trip output used for signalling or the like, to operate a switched or even latched bell alarm 56, without nuisance operation of the bell alarm and without the need for a separate bell alarm output circuit.

In order to pick off the trip signal without losing the normal options of indicator LED D1 and any remote reset capability, the available current from the trip output is shared by indicator D1 and the LED D2 of the optocoupler. An optocoupler LED normally requires minimal current to trigger conduction of the associated phototransistor, particularly where the phototransistor is a Darlington pair, and can be operated at a minimal forward voltage, e.g., 1.3 V. Resistor R5 is chosen to minimize current loading on the trip output circuit to about 0.6 mA.

In the embodiment shown in FIG. 4, the optically isolated trip signal at the collector of the Darlington pair Q1 is used to operate the coils L1 and L2 of a latching relay to activate; and deactivate a bell alarm device or the like (not shown in FIG. 4) coupled to the contacts 92 of the latching relay. The collector of the MOC221 Darlington optocoupler is coupled to the gate of FET Q2. FET Q2 is normally on, conducting in the absence of a trip signal. This produces a low voltage at the source lead of FET Q2 via the voltage drop through resistor R7, coupled to supply voltage $V_d$. Additionally, FET Q2 when conducting discharges parallel capacitor C2 and holds the input at pin 2 of comparator U2 low. Comparator U2 is one half of a MC14538 dual comparator.

When the trip signal occurs and the optocoupler 76 turns on, Darlington transistor Q1 conducts and reduces the voltage at the gate of FET Q2 via voltage drop through resistor R6, causing FET Q2 to turn off. Capacitor C2 then charges through resistor R7 according to their RC time constant. Resistor R7 is coupled between supply voltage $V_d$ and the comparator input of the MC14538 dual comparator U2, to which capacitor C2 and the source of FET Q2 are also connected.

In the untripped state, FET Q2 is on and the voltage at the input to U2 is kept less than $\frac{2}{3} V_d$. The voltage is in fact clamped near ground by FET Q2. Thus, when the circuit is not tripped, the output Q of comparator U2 is high and the not-Q output is low. Output driver Q3 (on the not-Q side of comparator U2) is off, and latch coil L1 is not powered. Subject to the action of the other half U3 of the MC14538 dual comparator, the Q output of U2 turns on FET Q4 and operates the unlatch coil L2. Diodes D3 and D4 shunt the back EMF of coils L1, L2, and resistors R9 and R10 provide biasing.

The trip signal of the ADVANTAGE line of contactors has a number of regular variations and a high level on the trip signal is not always due to a true trip detection. For example, the trip signal goes high during power up, blinks once during starts, blinks repeatedly during current overload conditions, and stays on steadily during an actual trip. The duration of pulses on the signal varies. However, about 300 mS is the longest duration for which the trip signal stays high, unless there is an actual trip. However, the optocoupler 76 responds to any high level on the trip signal, at least briefly turning on Darlington Q1, turning off FET Q2 and releasing the clamp on the R7-C2 charging circuit. Capacitor C2 begins to charge.

Capacitor C2 and resistor R7 are chosen to have a time constant that brings the voltage across C2 to ⅔ $V_d$ in about 350 mS, i.e., a longer time than the longest duration pulse on the trip signal except in the event of a true trip. Thus, pulses on the trip line fall off and FET Q2 again clamps capacitor C2 to ground and no change of state occurs in the outputs of comparator U2.

This shorting filter comprising the optocoupler, FET Q2 and timing circuit R7-C2 on the input of comparator U2, is unique in that the normal use of an MC14538 comparator is by switching its inputs, and in that the RC time constant can be accurately maintained with very inexpensive parts and minimal current draw.

Moreover, the filter is duty cycle independent. Regardless of the pulse width or the number of successive high going pulses on the trip signal, provided that no single pulse lasts long enough to charge capacitor C2 up to the triggering point of ⅔ $V_d$, the filter is cleared when the trip signal drops back to its low level. A very short off time fully clears the previous pulse by clamping C2 to ground, the FET conducting resistance being only about four ohms for rapidly discharging capacitor C2. The filter operates to block pulses, but will respond promptly to a steady state change in the level of the trip signal.

When a real trip signal occurs, the voltage across capacitor C2 climbs to ⅔ $V_d$, causing the Q and not-Q outputs of comparator U2 to change state. Driver FETs Q3 and Q4, and latch/unlatch relay coils L1 and L2 change state, and the bell alarm contacts 92 are operated.

When the high trip signal level goes away, which may also be due to activation of the remote reset button P1, or reset of the controller U1, FET Q2 turns back on and shorts capacitor C2. When the voltage on C2 drops to below ⅔ $V_d$, then U2, Q3, Q4, L1 and L2 all transition back.

Another problem is to ensure that the latched relay controls stay low (unlatched) on power up. This allows the host unit to correctly transmit the trip status without nuisance signalling. Referring to FIG. 4, this is accomplished using the other half U3 the MC 14538 dual comparator and a resistor R12 and capacitor C5 to control an over-ride FET Q5. On power up, the control for the latch relay comes up low and unlatch comes up high. The addition of resistor R8 to the "not tripped" Q output of the first half U2 of the dual comparator allows FET Q5 to pull down the main unlatch control from U2 for the duration of the power up delay. The power up delay lasts until capacitor C5 charges through resistor R12 to the logic level of the input to U3. At the end of the powerup delay, Q5 turns off and the trip signal coupled through Q 1 and U2 will be able to transition the relay as required. During the power up delay, the state of the unlatch relay will remain as it was before power was removed, because operation of FET Q4 is blocked while FET Q5 is pulling down its gate input. If the logic determines that a trip should be indicated, it will do so without regard to the power up delay. The relay will not be allowed to return to the not-tripped state (by operation of the unlatch relay coil L2) until after the power up delay has expired.

The switching means 54 can be powered from VAC by a simple unregulated power supply 96. In the embodiment shown in FIG. 4, capacitor C4 and resistor R11 couple AC power to rectifier diode D5 to charge storage capacitor C3, in parallel with the relay coils switched by transistors Q3 and Q4. Zener diode D6 limits the voltage at the anode of diode D5. The voltage $V_d$ can be regulated from the voltage on capacitor C3, or otherwise generated. Whereas the switching circuit is optically isolated from the power line coupled to the load by the contactor, the bell alarm is protected from noise on the load side of the circuit.

The invention having been disclosed in connection with the foregoing variations and examples,, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A contactor circuit operable for coupling electrical power to a load, comprising:

means responsive to a parameter of the electrical power, operable to generate a trip output signal that changes from one state to another state for representing presence and absence of a fault condition, the trip output signal including at least one short duration pulse wherein the trip output signal changes briefly to one of said states indicating the fault condition; and, a switching means coupled to the trip output signal comprising a timing circuit and a driver responsive to the timing circuit, the driver being coupleable to trigger an alarm output, wherein the switching initializes the timing circuit immediately upon the trip output signal changing to the other of said states, namely not indicating the fault condition, and wherein the timing circuit has a time constant exceeding a length of said short duration pulse;

whereby short duration pulses occurring on the trip signal are filtered to avoid triggering the alarm output.

2. The contactor circuit according to claim 1, wherein the contactor circuit comprises a trip output, a reset input and a circuit connecting the trip output to the reset input, and wherein said switching means is coupled to the trip output signal at the circuit connecting the trip output to the reset input.

3. The contactor circuit according to claim 2, wherein the circuit connecting the trip output to the reset input includes an optical coupler with an LED responsive to the trip output signal and a phototransistor responsive to the LED.

4. The contactor circuit according to claim 3, wherein the timing circuit comprises a capacitor arranged to charge through a resistor and a threshold responsive switching means responsive to a voltage on the capacitor, and wherein the switching means discharges the capacitor immediately upon absence of the pulse for initializing the timing means for each individual one of the pulses.

5. The contactor circuit according to claim 4, further comprising an alarm circuit coupled to an output of the threshold responsive switching means, the alarm circuit including at least one contact set for coupling power to an alarm device.

6. The contactor circuit according to claim 5, wherein the alarm circuit comprises a latching relay having a latch coil and an unlatch coil for respectively closing and opening the at least one contact set.

7. The contactor circuit according to claim 6, further comprising a power up reset circuit including switching means operable to disable the unlatch coil during an interval following application of power to the switching circuit.

8. A contactor circuit, comprising:

a switchable contactor for coupling an electrical power line to a load;

a current sensor responsive to a level of current on the power line, the current sensor providing an output signal that changes level when the current on the power line exceeds a predetermined fault threshold;

a control circuit coupled to the contactor and to the output signal of the current sensor, the control circuit having an output that changes level with the output signal of the current sensor, and a reset input;

an indicator circuit connecting the output of the control circuit to the reset input of the control circuit such that the control circuit is reset when the current on the power line exceeds the fault threshold;

a bell alarm circuit including an output for operating an alarm device, the bell alarm circuit having a comparator with an input coupled to a capacitor charged through a resistor and a transistor arranged to discharge the capacitor, said transistor being responsive to an optical coupler arranged in the indicator circuit such that the output of the control circuit allows the capacitor to charge when the current on the power line exceeds the fault threshold, and causes the transistor to discharge the capacitor when the current on the power line is less than the fault threshold, the capacitor and the resistor providing a time constant such that said discharge of the capacitor by the transistor prevents operation of the comparator and the alarm device upon occurrence of pulses on the output of the control circuit of a predetermined maximum duration and permits operation of the comparator and the alarm device upon occurrence of pulses exceeding the maximum duration.

9. The contactor circuit according to claim 8, wherein the indicator circuit connecting the output of the control circuit to the reset input of the control circuit includes an indicator LED in parallel with the optical coupler, and wherein the control circuit is arranged to blink the indicator LED to represent a status of the contactor circuit.

10. The contactor circuit according to claim 8, wherein the bell alarm circuit comprises a latching relay having a latch coil and an unlatch coil for respectively closing and opening at least one contact set.

11. The contactor circuit according to claim 8, further comprising a power up reset circuit including switching means operable to disable the output of the bell alarm circuit during an interval following application of power to the switching means.

12. The contactor circuit according to claim 8, wherein the bell alarm circuit comprises a latching relay having a latch coil and an unlatch coil for respectively closing and opening at least one contact set, and further comprising a power up reset circuit including switching means operable to disable the output of the bell alarm circuit during an interval following application of power to the switching means.

* * * * *